Jan. 6, 1959  C. F. WEINAUG ET AL  2,867,277
PRODUCTION OF HYDROCARBON MATERIAL
Filed Feb. 14, 1956  2 Sheets-Sheet 1

INVENTORS
CHARLES F. WEINAUG
DANIEL LING
BY
THEIR ATTORNEYS

United States Patent Office 2,867,277
Patented Jan. 6, 1959

2,867,277

PRODUCTION OF HYDROCARBON MATERIAL

Charles F. Weinaug and Daniel Ling, Lawrence, Kans., assignors to The University of Kansas Research Foundation, Lawrence, Kans., a corporation of Kansas Application February 14, 1956, Serial No. 565,358

10 Claims. (Cl. 166—9)

This invention relates to the recovery of naturally occurring petroleum from underground reservoirs, or oil-bearing formations. More particularly, it relates to an improved process for recovering petroleum by means of displacement materials injected into the reservoir to displace the petroleum and drive it toward production wells from which the petroleum is withdrawn.

Aside from the recovery of oil from formations by means of pressure depletion two other methods have been commonly applied. One involves the injection of natural gas into the formation, as by recycling the gas from the field. This increases recovery of petroleum beyond that gained by pressure depletion. However, the normal recovery obtained by this method does not exceed about 50 percent of the oil originally present in the reservoir. Another procedure, generally applied to secondary recovery, involves injection of water into the formation to displace the oil toward production wells. Water flooding will recover a greater proportion of oil than the foregoing procedures but it still leaves as much as 20 or more percent of the oil in the formation when the flood has reached the stage where the ratio of water to oil being pumped is so great that it is uneconomical to continue production. Also, water flooding has been found to be impractical in deep formations, and all formations are not susceptible to flooding.

In both gas injection and water flooding the viscosity of the injected material is widely different than that of the petroleum, and as a result the injected material tends to slip by the oil in the pores of the formation, which explains why a substantial proportion of oil is left in the formation when using such practices. This may be explained as follows, with reference particularly to gas injection. As the amount of pore space in the formation occupied by gas increases up to about 10 to 20 percent, flow of the oil phase is obstructed for the gas itself normally does not flow but an increase in resistance to the flow of oil arises due to the fact that the gas phase occupies part of the flow channels that would otherwise be used by the moving oil. As the space occupied by gas increases above 10 to 20 percent the resistance to the flow of oil continues to increase while at the same time the gas starts to flow. Since the viscosity of oil is many times that of the gas, much more energy is required to force the oil through the pores of the formation. The energy to cause flow is, of course, created by supplying the gas under pressure, and accordingly a point is reached at which the flow rate of the gas becomes many times that of the oil. Consequently gas displaces oil inefficiently. Much the same explanation may be applied to water flooding.

In a copending application, Serial No. 316,333, filed October 23, 1952 now abandoned, by Charles F. Weinaug, one of the present applicants, and owned by the assignee of the present application, there is disclosed a method adapted to avoid the disadvantages and troubles alluded to above. Briefly, it involves injecting into the formation a material miscible with petroleum. Most suitably there are used for this purpose hydrocarbons derived from petroleum such as hydrocarbons of intermediate boiling point, e. g., normally liquid hydrocarbons such as those of intermediate boiling point found in natural gasoline, or normally gaseous hydrocarbons of high boiling point, e. g., mixtures of propane and butane containing normal amounts of ethane and pentane (commonly called LPG), to displace the petroleum. Subsequently at least one other fluid material is introduced in sequence, each material being miscible with the preceding injected material and with that which follows it, if any, whereby during production of the petroleum single fluid phase conditions are established across the fronts between the petroleum and the primary injected fluid material as well as across the fronts existing between the successively injected fluids of different composition so that during the production of petroleum there is maintained a continuously varying fluid phase in the reservoir from the petroleum to the last fluid injected. In the preferred practice the last injection fluid is dry natural gas.

Although in the preferred practice of the method of that application each of the injected materials is miscible with that ahead of it and with that behind it, the displacement process may be carried out with injected material that is mutually miscible between two non-miscible materials. Thus there may be used certain alcohols, ketones, aldehydes, and the like which are miscible with many petroleums followed by water, which is also miscible with the alcohol, aldehyde, or ketone but is not miscible with the petroleum.

Failure to obtain complete displacement of the oil in the formation by water flooding or gas injection is due to the interface formed between the petroleum and the water or gas, which are not miscible with the petroleum. The method described in Serial No. 316,333, can result in high petroleum recovery, even upwards of 90 percent of the amount in the reservoir, and this improved recovery as compared with prior methods is due to the fact that interfaces between non-miscible materials are eliminated.

Although practice in accordance with the aforesaid application is capable of giving excellent recovery, as just indicated, it has been found that under some circumstances the recovery is not as good as desired. We have found that this is due to the development of long finger-like projections of displacing material into a zone, or zones, ahead of it so that the uniformity of the fronts in the formation is disturbed with development of a ragged front. This fingering may result in breaking through of displacement fluid into the original petroleum, and where the break-through results in contact of a displacement material, such as natural gas, that is not miscible with petroleum an interface is created. As a result, conditions are then established that are essentially equivalent to the older processes described briefly above that use immiscible displacement fluids, and consequently the high efficiency of the process of Serial No. 316,333 is greatly reduced.

In the case where hydrocarbons derived from petroleum are used as the displacement fluids in the process of that application with natural gas as the final displacement material fingering likewise may break the continuity of the front between the natural gas and the immediately preceding displacement fluid with movement of the gas toward the petroleum front, and this is disadvantageous even though break-through into the petroleum does not occur. Thus, in general the hydrocarbon fluids used are more valuable than natural gas so that it is desirable to recover them as completely as possible by natural gas drive, but where fingering occurs there will be recovered mixtures of hydrocarbon fluids and natural gas with substantial amounts of the more valuable hydrocarbon fluids remaining in the reservoir, which is economically disadvantageous even though the recovery of petroleum itself is not seriously impaired by break-through.

It is among the objects of this invention to provide an improved displacement process for the recovery of petroleum from underground reservoirs, or formations, that is simple, easily practiced and efficient, and assures excellent recovery of petroleum and valuable displacement fluids.

Another object is to provide a displacement method of producing petroleum in which single fluid phase conditions are established at fronts in the reservoir between fluids of different composition and a continuously varying fluid phase is present from the petroleum to the displacement fluid at the point of injection with no interfaces existing and in which disintegration of the fronts with development of fingering between injected materials of different composition, due to non-uniform and varying speeds of travel, is avoided, and which is adapted particularly to avoidance of fingering in the method of the aforesaid application Serial No. 316,333.

Other objects will appear from the following specification.

The invention will be described with reference to the accompanying drawings in which.

We have discovered that the development of fingers occurs when there is a sharp viscosity difference between a displacing material and displaced material ahead of it, and that this situation exists because the hydrocarbon displacement fluid and the petroleum do not mix, at least to substantial extent, in the reservoir even though they may be miscible above ground. This condition tends to cause the front between the two fluids to become unstable so that if a small quantity of displacement fluid moves slightly ahead of the main front between it and the preceding fluid the resistance along the flow path at this point will decrease faster than the adjacent flow paths due to the lower viscosity of the displacement material. Thus the rate of flow increases along this path relative to adjacent paths with formation of a finger, and once formed the condition will tend to become more and more severe.

We have discovered further, and it is upon this that the invention is in large part predicated, that fingering and its attendant disadvantages may be avoided, or at least largely suppressed, by initially establishing a transition zone between the petroleum and the hydrocarbon displacement fluid used by injecting first into the formation a premixed body of the petroleum mixed with liquid hydrocarbon material to provide a zone of viscosity intermediate that of the petroleum and the hydrocarbon displacement fluid so that there is no sharp change of viscosity between the petroleum and the following, or displacement, material. In this way we have been able to overcome the fingering difficulty described above, with consequent desirable high recovery of petroleum from the formation.

In its preferred practice the invention is applied to the method disclosed in the aforesaid application Serial No. 316,333. That is, the transition zone of this invention is followed by at least one hydrocarbon fluid of the type described above, and preferably by a series of such fluids, with eventual final injection of natural gas. Where more than one displacement fluid is used similar transition zones are established between them, likewise in accordance with this invention. That is, after each hydrocarbon fluid there is injected a mixture of it and the next such fluid to provide between the two fluids a transition zone of viscosity intermediate between them. Thus we establish a continuously varying fluid phase from the petroleum to the final methane with no interfaces.

Figure 1:
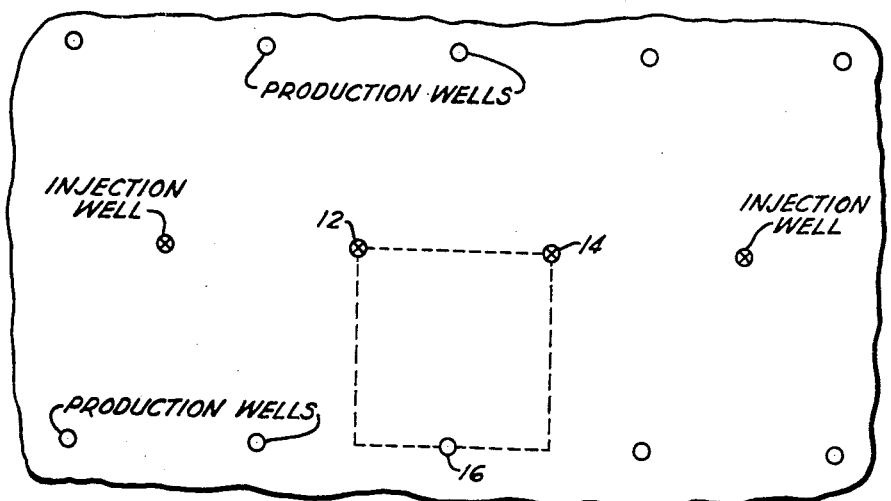
Fig. 1 is a surface plan view of a portion of an oil field diagrammatically depicting an arrangement, or spacing, of petroleum production wells and displacing fluid injection wells.

Referring now to the drawings, an oil field to be produced by the displacement production method is drilled for production wells and injection wells in a pattern of spacing, such as that shown in Fig. 1, which will provide for the displacing fluids when injected to penetrate the largest portion of the reservoir possible. Injection wells 12 and 14 and production well 16 form a unit of the field pattern and the unit shown in dotted lines on the surface plan view Fig. 1 is carried over for illustration purposes to the reservoir plan views of Figs. 2 and 3.

In a new oil field production is begun by withdrawing some of the petroleum from production wells, such as 16, by the usual production methods. This crude oil is refined or separated in such a manner as to yield the first fraction of displacing material to be injected into the reservoir through injection wells 12, 14 and the others. In most instances, the initially injected displacing material will be and is preferably either a fraction comprised of normally liquid hydrocarbon materials of intermediate boiling point, such as those in the natural gasoline boiling range, or a fraction comprised primarily of normally gaseous hydrocarbon materials of high boiling point, such as a typical LPG fraction comprised substantially of propane and butane and containing minor amounts of pentane and ethane. The intermediate boiling point hydrocarbons can be a suitable straight run gasoline fraction of the usual natural gasoline hydrocarbons separated from the crude oil. However, of course, these materials can be supplied from an outside source, and in the case of the LPG this will most likely be the case, being supplied as the bottoms from a natural gasoline plant deethanizer which is fed by the overhead from a debutanizer. In any instance, the important requirement is that the displacing material be miscible with the crude oil or petroleum.

In accordance with the present invention a transition zone of a material or materials of intermediate viscosity is established in the reservoir prior to introduction of the first displacing stream. This is accomplished by injecting a mixture of crude oil and hydrocarbon fluid, such as those just referred to, into the reservoir through wells 12 and 14. In most cases a plurality of different mixtures is preferred with each successive following mixture being richer in hydrocarbon fluid and of decreasing viscosity so that a low viscosity gradient is established within the reservoir between the petroleum and the transition zone and between the latter and the following displacement fluid. We have found that such a sequence provides for the establishment of a transition zone between the petroleum and the hydrocarbon displacement fluid so that the displacement process gets underway as desired. For making the transition zone or zones material there may be used normally liquid hydrocarbons of intermediate boiling point, such as those boiling within the natural gasoline range. Preferably, however, a typical LPG fraction is pre-mixed with the petroleum to supply material for the transition zone. The next step is to establish a series of displacing fluid zones in the reservoir as described in the copending application No. 316,333 until the final injection material, methane or natural gas, is reached, with the following distinction. After a sufficient amount of the first displacement fluid has been injected there is injected a mixture of it and the next following displacement fluid, or a series of such mixtures, again to provide a transition zone of intermediate viscosity, followed by the displacement fluid. This procedure is followed up to the final methane injection.

The quantity of each injection mixture used must be such that as radial spread of said material occurs outward from the injection wells, the effective low viscosity gradient between the petroleum and the last injected relatively pure displacing hydrocarbon will still be maintained in spite of any narrowing of the transition zone. In many instances, the quantity of mixture injected is sufficient to maintain a band of said mixture of from 3 to 100 feet wide within the reservoir.

Figure 2:
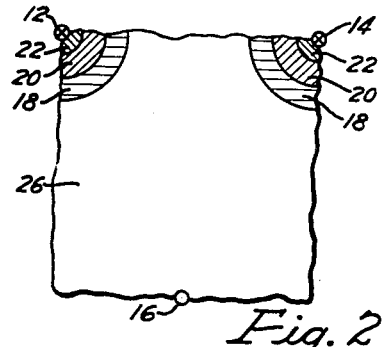
Fig. 2 is an enlarged reservoir horizontal sectional view, for illustration purposes, of the portion of the reservoir shown in dotted lines in Fig. 1, diagrammatically depicting an early stage of injection and production, and showing by cross-hatching portions of the reservoir saturated with displacing materials injected according to our invention.
Figure 3:
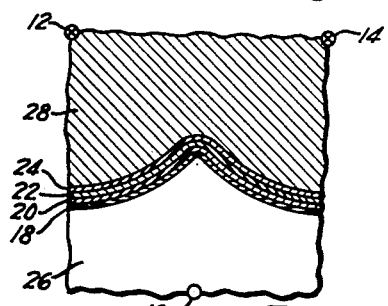
Fig. 3 is a diagrammatic plan view of the reservoir portion shown in Fig. 2 at a later stage of injection and production.

Figs. 2 and 3 show successive stages of the above-described process. Fig. 2 shows the process at the early stage when transition zone materials are being injected. 26 represents the area of the reservoir with the original petroleum in place to be displaced by the injected materials. Bands 18, 20 and 22 represent three injected transition zones of the type described. Fig. 3 shows a later stage in the process after methane has been injected for some time following injection of a band 24 representing zones of hydrocarbon fluids as disclosed in Serial No. 316,333 and as described above and which presents a continuously varying fluid phase between band 24 and the natural gas 28, with no interfaces in band 24 or at its front 22—24 or its front 24—28. The unshaded area 26 represents the original petroleum remaining in the reservoir at this stage, while the shaded area 28 represents the area invaded by the dry natural gas. A low viscosity gradient has been established from area 26 to area 28 while maintaining a continuously varying fluid phase without interfaces between the original crude oil and the finally injected methane or dry natural gas. The drawings are for illustration purposes only and are not intended to be to scale or proportion for any actual operation.

Figs. 4 to 10 are drawings duplicating photographs of experimental equipment and tests, now to be described.

Figure 6:
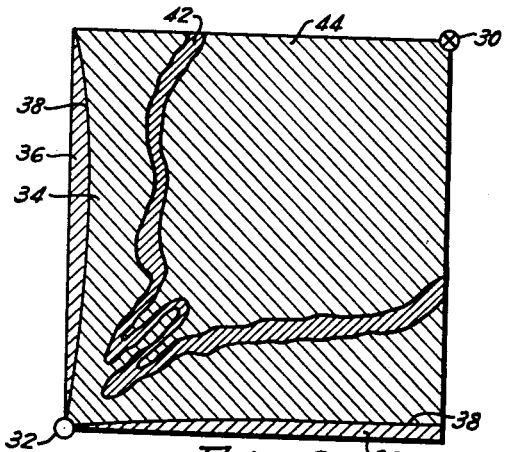
Figure 7:
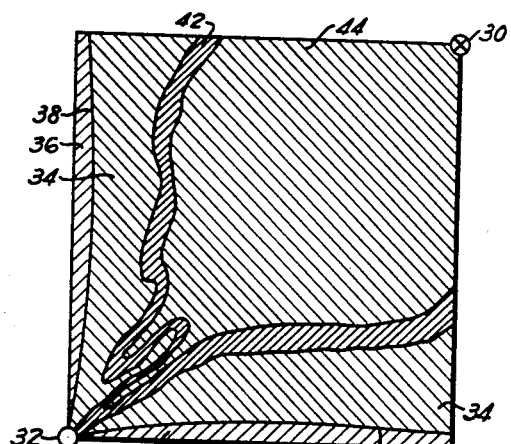
Figure 8:
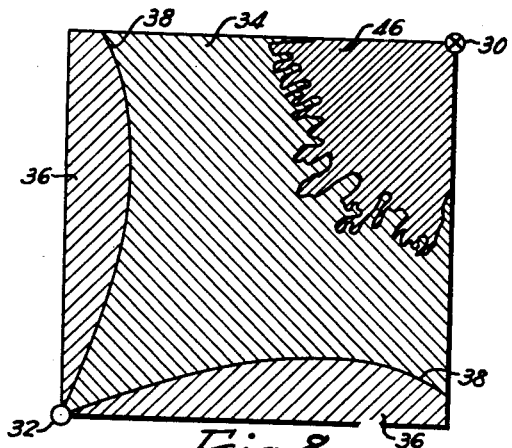
Figs. 8, 9 and 10 are drawings made from and duplicating photographs of equipment and results in experimentally carrying on a displacement process not embodying the novel features of the invention.
Figure 9:
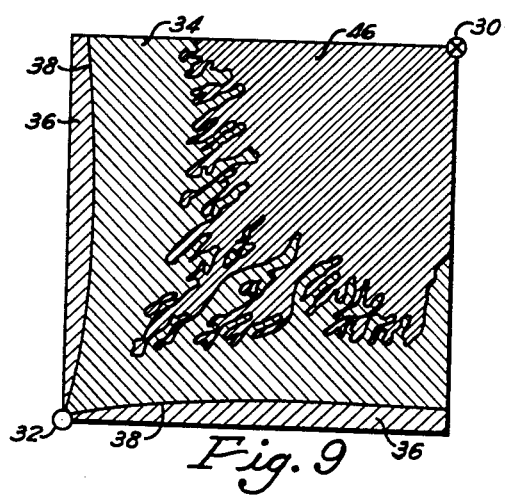
Figure 10:
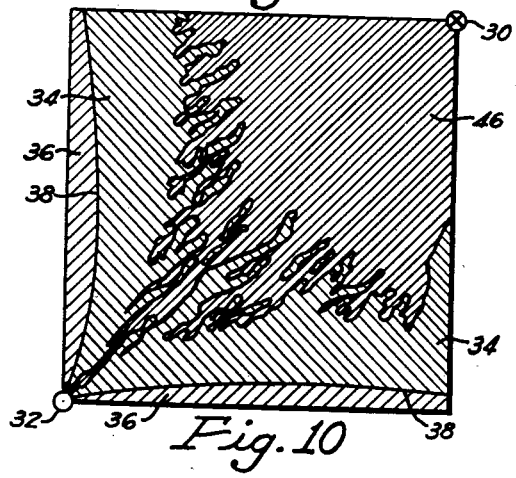

In these drawings, Figs. 4 through 7 depict the results of two test runs, and this is also true of Figs. 8 through 10. Each test was conducted using two flat, spaced pieces of plate glass placed in a horizontal position with one piece on top of the other. Each of the plate glasses was approximately 18 inches square. The bottom piece of glass had a hole in one corner (32) and the top piece had a hole in the corner (30) diagonally opposite thereto. The squares of plate glass were separated by pieces of shim-stock material one-inch wide and 1/100 of an inch thick, placed around the outer edges. Small disks of similar shim-stock were also placed between the sections of plate glass at various points in the inner portions. The shim-stock and the sections of plate glass formed a container 0.01" x 18" x 18". The outer strip of shim-stock was cut away at the corners having the holes so that there was communication with the container from the outside through the holes (30 and 32) in the glass. The outer edge of the assembly was cemented to prevent leakage, clamps were spaced around the outer edge to securely hold the plates together. Conduits were connected to the assembly inlet and outlet (30 and 32) so that liquid material could be passed into or withdrawn from the container. In carrying on the tests described hereinafter and depicted on the drawings, the fluids were injected into the container while said container was kept under a pressure less than atmospheric. The atmospheric pressure on the outside of the glass plates forced them together into contact with the spacing shim-stock and provided even spacing between the glass plates. In the tests, the container was filled with hydrocarbon material to be displaced and the displacing material was introduced through inlet 30 by allowing atmospheric pressure to force it in at the desired rate, and the displaced material was drawn out under partial vacuum through outlet 32.

Figure 4:
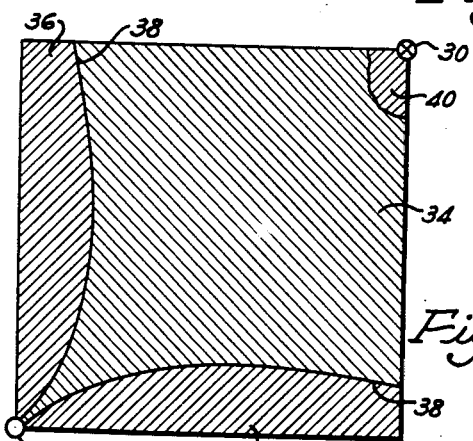
Figs. 4, 5, 6 and 7 are drawings made from and duplicating photographs of equipment and results obtained in experimentally testing the new process of the invention.

Fig. 4 depicts the results of a displacement process where both the displaced and displacing materials had the same viscosity. The container was filled with a refined mineral oil which was displaced by some of the same mineral oil containing a trace of blue dye. The colored oil entered through hole 30 and the displaced colorless mineral oil was withdrawn through hole 32. The cross-hatched area 34 was the portion of the container having the displacing colored oil when it broke through to hole 32, as shown, and the cross-hatched areas 36 are the portions of the container still containing the non-dyed oil at this break-through time. A well defined and uniform front 38 between the displaced and displacing material resulted and was maintained throughout the displacement.

Figure 5:
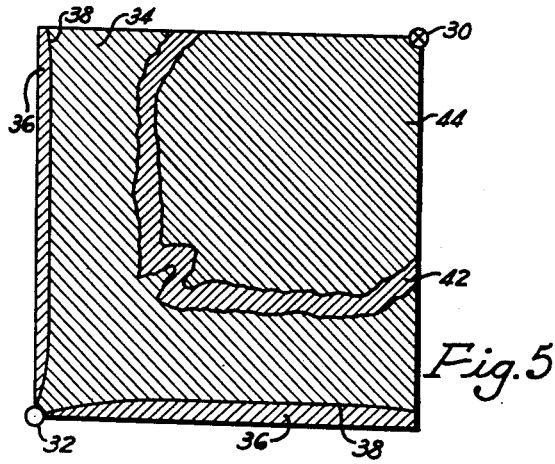

Fig. 4 depicts the beginning of the new flood or displacement test wherein the blue dyed mineral oil in the container from the previous test (discussed hereinbefore) was displaced by a refined mineral quench oil of relatively low viscosity as compared to the displaced mineral oil. Namely, the test was run at 82.4° F., and the viscosities of the mineral oil and quench oil were 80.2 centipoises and 29.6 centipoises, respectively, or a viscosity ratio of 2.7:1. The injection and withdrawal procedure was the same as in the other test. A transition zone between the displaced mineral oil and displacing quench oil was established, and the cross-hatched area 40 on Fig. 4 shows the initial injection to establish the transition zone. Figs. 5 and 6 depict later stages of the displacement operation, and Fig. 7 depicts the situation at break-through of the transition zone material to outlet hole 32. The transition zone 42 in Figs. 5 and 6 consisted of three successively injected portions, the first 75 volume percent mineral and 25 volume percent quench oil, the second 50 volume percent mineral oil and 50 volume percent quench oil, and the third 25 volume percent mineral oil and 75 volume percent quench oil. A quantity of 1.03 ml. of each mixture was passed into the container, followed by the pure quench oil depicted by cross-hatched area 44 in Figs. 5 and 6.

No fingering or non-uniform movement of the front was apparent until the volume input equaled 15 ml. Fig. 5 shows the development of slight fingering at approximately the half-way mark, but it was not of any magnitude or serious. The non-uniform front movement is more pronounced in Fig. 6. Break-through is depicted in Fig. 7 at which time 28.6 ml. of the mineral oil had been displaced.

Figs. 8, 9 and 10 depict results of tests run in the same manner and under the same conditions as the other tests described hereinbefore, and with the same materials except with no transition zone supplied in accordance with the present invention. Fig. 8 shows by areas 34 and 36 and front 38 the same results as shown in Fig. 4. The pure quench oil was injected into the container through hole 30, and is depicted by cross-hatched area 46. The progress of the flood or displacement is self-evident. Fig. 8 shows pronounced fingering at a very early stage, Fig. 9 shows great by-passing of the mineral oil, and the break-through shown in Fig. 10 has come very early with poor recovery of the displaced mineral oil.

When the containers were tested in each case for a one to one viscosity flood or displacement, the recovery of displaced mineral oil in each instance was approximately 71½ volume percent, indicating that the conditions within the plates were completely uniform.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In a method of recovering petroleum from an underground formation the steps comprising displacing the petroleum from the formation to and recovering it from a production well by injecting into the formation at least one premixed fluid mixture of petroleum and a hydrocarbon fluid, said mixture being of viscosity intermediate of said petroleum and said hydrocarbon fluid, and then injecting a hydrocarbon displacement fluid, said mixture supplying a transition zone between the petroleum and said fluid.

2. A method according to claim 1, said hydrocarbon fluid being selected from the group consisting of normally liquid hydrocarbons in the natural gasoline boiling range and mixtures of propane and butane.

3. A method according to claim 2 in which the hydrocarbon displacement fluid is dry natural gas.

4. That method of recovering petroleum from an underground formation comprising displacing the petroleum from the formation to and recovering it from a production well by injecting into the formation a succession of premixed mixtures of said petroleum and fluid hydrocarbon material selected from the group consisting of normally liquid hydrocarbons in the natural gasoline boiling range and mixtures of propane and butane, said mixtures being of progressively increasing content of said material and of progressively decreasing viscosity, then injecting at least one of a series of hydrocarbon materials derived from petroleum and of progressively decreasing boiling point miscible with the last of said mixtures.

5. A method according to claim 4 in which the final hydrocarbon displacement fluid is natural gas.

6. That method of recovering petroleum from an underground formation comprising displacing the petroleum from the formation to and recovering it from a production well by introducing into the formation a succession of premixed mixtures of said petroleum and fluid hydrocarbon material selected from the group consisting of normally liquid hydrocarbons in the natural gasoline boiling range and mixtures of propane and butane, said mixtures being of progressively decreasing viscosity, then injecting hydrocarbon fluid of said natural gasoline boiling range, then injecting a mixture of propane and butane, and finally injecting natural gas, and between each of said injections injecting a premixed mixture of the preceding and the following hydrocarbon fluids.

7. In a method of recovering petroleum from an underground formation containing it in which the petroleum is displaced toward and withdrawn from a production well by injecting into the formation a succession of hydrocarbon fluids the first of which is normally miscible with said petroleum and is normally liquid, and the last of which is methane, each successive fluid material being miscible with its predecessor and its successor, with consequent establishment of a continuously varying fluid phase from said petroleum to the last of said hydrocarbon fluids with no interfaces between the successive fluids, the improvement comprising the steps of initially establishing a transition zone between said petroleum and the first of said hydrocarbon fluids by injecting into the formation a premixed mixture of said petroleum with a hydrocarbon fluid, the viscosity of said mixture being intermediate that of the petroleum and the first of said hydrocarbon fluids, and thereafter establishing a transition zone between each of the successive hydrocarbon fluids by injecting after each such fluid at least one premixed mixture of the fluid last injected and that to be next injected, the viscosities of the mixtures being intermediate of the two respective fluids.

8. A method according to claim 7 in which said transition zone between the petroleum and the first hydrocarbon fluid is established by injecting into the formation a succession of premixed mixtures of the petroleum and the hydrocarbon fluid that are of progressively increasing content of hydrocarbon fluid whereby there is gradual decrease of viscosity in the transition zone from that of the petroleum to that of the first of said hydrocarbon fluid injections.

9. A method according to claim 7 in which the successive hydrocarbon fluids are materials boiling in the natural gasoline range, and porpane-butane mixtures respectively.

10. A method according to claim 7 in which said transition zones are formed of a series of said mixtures that are successively of increasing content of the next following hydrocarbon fluid.

References Cited in the file of this patent

UNITED STATES PATENTS

| 2,742,089 | Morse et al. | Apr. 17, 1956 |

FOREIGN PATENTS

| 726,712 | Great Britain | Apr. 13, 1953 |
| 696,524 | Great Britain | Sept. 2, 1953 |

OTHER REFERENCES

Arnold: Secondary Recovery Oil and Gas Journal, page 290, July 28, 1949.